United States Patent
Jeanniot

(10) Patent No.: US 9,002,273 B2
(45) Date of Patent: Apr. 7, 2015

(54) APPARATUS AND PROCESS FOR DETECTION OF A BLUETOOTH DEVICE

(75) Inventor: Christophe Jeanniot, Antibes (FR)

(73) Assignee: ST-Ericsson SA, Plan-les-Ouates (CH)

( * ) Notice: Subject to any disclaimer, the term of this patent is extended or adjusted under 35 U.S.C. 154(b) by 216 days.

(21) Appl. No.: 13/386,058

(22) PCT Filed: Jul. 20, 2010

(86) PCT No.: PCT/EP2010/004425
§ 371 (c)(1),
(2), (4) Date: Mar. 29, 2012

(87) PCT Pub. No.: WO2011/009590
PCT Pub. Date: Jan. 27, 2011

(65) Prior Publication Data
US 2012/0184217 A1    Jul. 19, 2012

(30) Foreign Application Priority Data
Jul. 21, 2009    (FR) ..................... 09 03591

(51) Int. Cl.
*H04B 7/00* (2006.01)
*H04M 1/60* (2006.01)
*H04W 8/00* (2009.01)

(52) U.S. Cl.
CPC ............ *H04M 1/6066* (2013.01); *H04W 8/005* (2013.01); *H04M 2250/02* (2013.01)

(58) Field of Classification Search
USPC ....................................... 455/41.2
See application file for complete search history.

(56) References Cited

U.S. PATENT DOCUMENTS

| | | |
|---|---|---|
| 2003/0220765 A1 | 11/2003 | Overy et al. |
| 2006/0003788 A1* | 1/2006 | Yokoshi et al. ............. 455/522 |
| 2011/0305340 A1* | 12/2011 | Eisenbach ................... 380/270 |

FOREIGN PATENT DOCUMENTS

| | | |
|---|---|---|
| EP | 1 613 038 A2 | 1/2006 |
| EP | 2 073 514 A2 | 6/2009 |
| JP | 2003-323682 A | 11/2003 |
| JP | 2007-067724 A | 3/2007 |
| WO | 2008/087409 A1 | 7/2008 |

OTHER PUBLICATIONS

International Search Report issued in corresponding International Application No. PCT/EP2010/004425, mailed Sep. 16, 2010.
Written Opinion issued in corresponding International Application No. PCT/EP2010/004425, mailed Sep. 16, 2010.

* cited by examiner

*Primary Examiner* — Ajibola Akinyemi
(74) *Attorney, Agent, or Firm* — Patent Portfolio Builders PLLC

(57) ABSTRACT

Electronic apparatus comprising bluetooth type communication means allowing data wireless data communication, including audio communication, to a satellite (20), said device including a main baseband host (100) and a bluetooth type controller (200); said main baseband host comprising a PROFILE layer allowing the generation of AT type command arranged for the activation of an alarm circuit on said satellite.

9 Claims, 3 Drawing Sheets

APPARATUS AND PROCESS FOR DETECTION OF A BLUETOOTH DEVICE

TECHNICAL FIELD

The present invention relates to the field of electronics, and more particular to an apparatus and process for detection of a Bluetooth device.

BACKGROUND ART

Wireless communication is spreading at the same time the devices and appliances are being developed for our everyday life, and particularly appliances fitted with bluetooth capabilities.

Thanks to wireless communications permitted by such standard, various appliances such as mobile telephones, laptop computers and other Portable Document Assistance (PDA) may easily communicate with various interfaces such as a audio headset etc. . . . so as to improve the comfort of the end user.

However, wireless communications have the consequence of moving away the different appliances and accessories, thus resulting in a significant number of situations where said accessories are being lost.

It is desirable to have an effective process for finding, when necessary, a Bluetooth type device.

SUMMARY OF THE INVENTION

It is an object of the present invention to achieve a process for detecting a Bluetooth device located close by another bluetooth device.

It is another object of the present invention to achieve a process and apparatus for easily finding a Bluetooth type accessory, such as an audio headset for instance, which might be lost.

Those objects are achieved by means of an electronic apparatus comprising Bluetooth type communication means allowing wireless communications, for instance audio wireless communication, towards a bluetooth type satellite, comprising a baseband central unit and a Bluetooth type communication controller;

The baseband unit carries out a PROFILE layer, allowing the generation and the transmission of a AT type command for the purpose of activating an alarm on said satellite.

In one particular embodiment, the apparatus comprises means for detecting the Received Signal Strength Indication (RSSI) so as to determine the strength of the signal received from the satellite and further includes means for acceding a look-up table for deriving an information representative of the distance separating the apparatus from the satellite.

Preferably, the information representative of the distance is displayed on said apparatus. It may also be reported by alternative means.

In one particular embodiment, the apparatus consists in a mobile telephone or a telephone fitted with bluetooth capabilities, or a PDA type personal assistant fitted with bluetooth functionalities.

There is also achieved a process for detecting by a first electronic apparatus, fitted with Bluetooth capabilities, of a second electronic apparatus also fitted with Bluetooth capabilities, which comprises the following steps:
an initializing step for activating the Bluetooth type communication means on the first apparatus;
the establishment of a request for connection transmitted by said first apparatus to the second apparatus;
a test for determining whether the request for connection can succeed and, in that case:
  evaluation of the presumed distance between said first and second apparatus by means of a RSSI information and the reading of a look-up table between said RSSI information and the presumed distance;
  display of the distance information to the user;
  generation and transmission of one specific AT+BLOC commande associated with a parameter ON for activating an alarm circuit indicative of the presence on the second apparatus;
in case of failure of the test:
  configuration in a permanent search mode involving new attempts of connection with said second apparatus and the subsequent test of the successful establishment of such connection and, when said connection succeeds:
  warning the user of the successful detection of said second apparatus:
  generation and transmission of a specific AT+BLOC commande associated with a ON parameter for activating an alarm circuit indicating of the presence on said second apparatus;

In one particular embodiment, the user is reported the detection of the second apparatus by means of a signal which is displayed or, alternatively, by any other means such as an auditive and/or vibratory means.

Preferably, when the alarm has been issued, the process involves the transmission of a AT+BLOC (OFF) commande for deactivating the alarm circuit on the second apparatus.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENTS

There will now be described one embodiment of a process according to the present invention which allows the handling of the problem of the distance with a Bluetooth type accessory or device.

The invention is particularly adapted for the realization of a mobile telephone of the latest generation, comprising extended audio capabilities allowing the transmission of audio flows of data to a codec or to a wireless headset complying with the Bluetooth standard.

Figure 1:
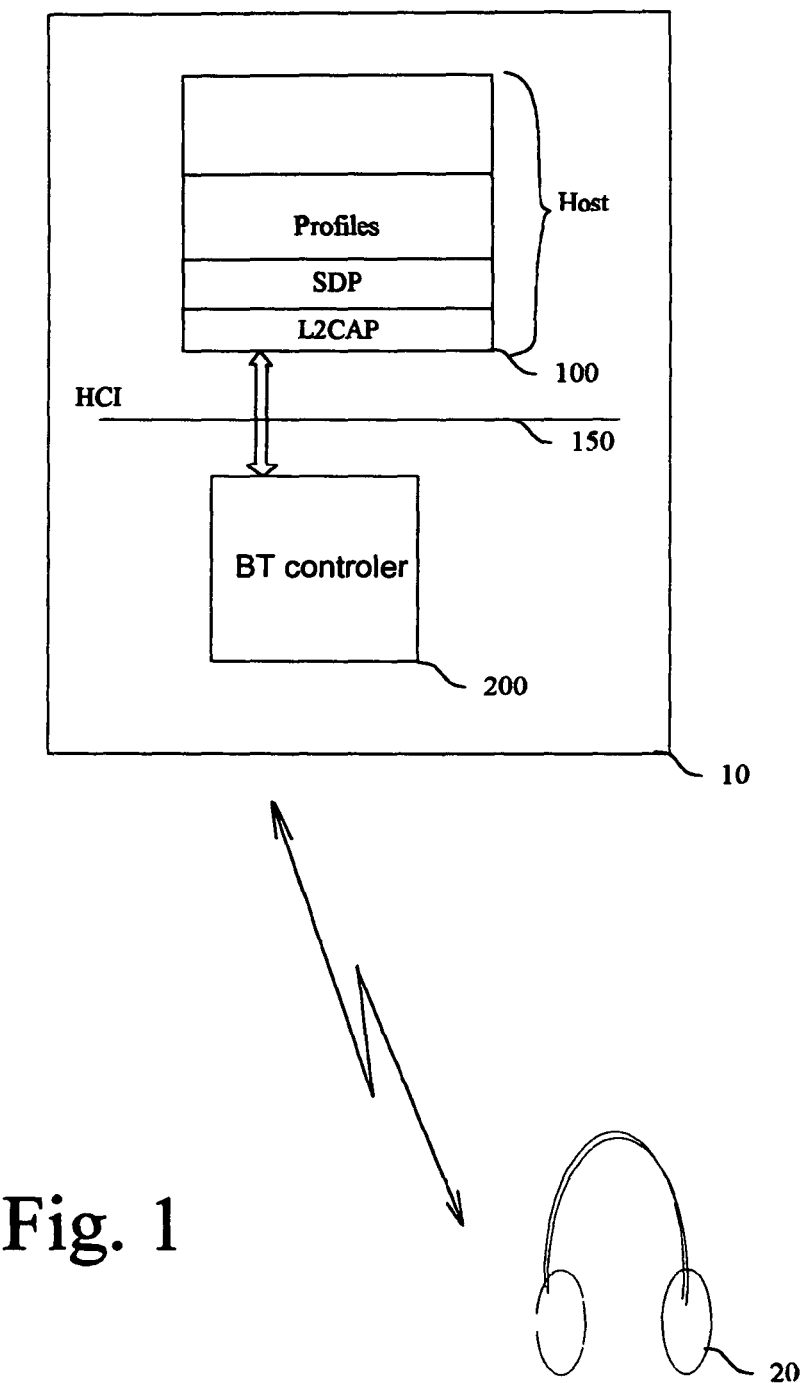
FIG. 1 illustrates the general architecture of an apparatus 10 comprising a host and a bluetooth communication controller executing the process described in this application.

With respect to FIG. 1, one sees an apparatus 10 which comprises a host or baseband 100, for instance a baseband unit in the specific case of a mobile telephone, which comprises means for storing audio files, such as mp3 audio files, and a user interfere allowing the selection of files and the activation of audio functionalities by the user. A skilled man will easily adapt the architecture of FIG. 1 to any Personal Document Assistant (PDA), to any laptop computer and generally to any mobile information handling system (I.H.S.).

Typically, the host includes a (not illustrated) processor which communication via an address and data bus with one or more Input Output (I/O) units, and with Read Access Memory (RAM) and storage memory, such as Read Only Memory (ROM), EPROM (Erasable Programmable Read Only Memory) or FLASH memory. Those elements are well known to the skilled man and will not be further elaborated on.

Generally speaking, the memory is used for the purpose of storing the user files, such as audio files complying with the mp3 standard, and also for the storing of instructions and microprograms for carrying out the extended functions of the apparatus 10. In the particular case of a mobile telephone, the host 100 comprises, in addition, the transmission and receiving circuits which allows a wireless communication in accordance with a predetermined standard.

Alternatively, apparatus 10 may be any other electronic appliance distinct from a mobile or cellular phone.

In addition, portable apparatus 10 comprises a bluetooth controller 200 which communicates with the bandbase host for the purpose of establishing and handling a wireless communication complying with the bluetooth standard, and particularly a wireless transmission of audio files to a distant satellite 20, such as a wireless headset for instance. The audio data being received are streamed and encapsuled, as known in the art, in one A2DP (Advanced Audio Distribution Profile) profile.

Bluetooth controller 20 includes its own processor (not illustrated) and its companions circuits allowing the transferring, in a streaming mode, of audio files with the satellite unit 20 or the wireless headset.

The host 100 and the bluetooth controller 200 communicate with each other by means of a communication interface 150 which is known under the designation Host Controller Interface (HCl) allowing exchanges of messages and events permitting the control of controller 200 by the host. Communication interface 150 permits the Host 100 to control via controller 200 the Bluetooth link, which further includes a Link Manager (LM) layer allowing the establishment, the handling and the closing of the connection link.

The apparatus of the invention comprises extended functions allowing the handling of the distance with a distant satellite.

In one particular embodiment, Host 100 interprets on information received from controller 20, which is an information of the type Received Signal Strength Indication (RSSI)-conventionally used in the art for allowing two communicating elements 10 and 20 to control the emission power. That information RSSI is used for deriving one information representative of the distance between the apparatus 10 and the satellite 20. For that purpose, the mobile uses a look-up table between the information representative of the strength and the distance presumed between the apparatus and the accessory or bluetooth satellite.

It should be noticed that, during such period of determination of the distance from the knowledge of the RSSI signal, one controls the mobile so as to deactivate the function <<Power Control Request>> (PCR) so as to avoid that the satellite device changes its power of emission, what would spoil the measurement of the distance between the mobile and the bluetooth accessory or satellite.

Such information of distance is then displayed on one or the other, or even on both apparatus, so as to advise the user about the close proximity of the satellite 20 with respect to the apparatus 10.

Such information is generally not sufficient for handling the proximity or, conversitly, the remote distance of the satellite with respect to the mobile telephone, particularly when such satellite has been lost pas the user.

With respect to FIG. 1, one sees that the communication between host 100 and bluetooth controller 200 goes through a series of software layer which are defined in the Bluetooth Core Specification du Bluetooth SIG (Special Interest Group) and which carries out a successive encapsulation of the communication between the two communicating apparatus 10 and 20, which particularly include:

Layer L2CAP (Logical Link Control and Adaptation Protocol);

Layer SDP (Service Discovery Protocol);

Layer Profiles

Those layers are well known to the skilled man and will not be further elaborated on.

Layer SDP is used for describing the particular category to which belongs the satellite 20 and, correspondingly, the PROFILE layer describes the different functionalities provided by the satellite 20.

If the device 20 is a hand-free device, a specific profile will be assigned to it, which covers a determining number of functions. In the particular case of a audio headset, which is one particular embodiment of the invention, one may consider a HSP (HandSet Protocol) type profile or, more recently, a HFP (Hands Free Profile) profile.

The communication between the <<profile>> layers of the two communicating apparatus 10 and 20 is achieved by means of a set of AT type commands, which are defined in the standardizing reference documents of the bluetooth standard, and particularly in the reference documents relating to the Hands-Free Profile and Headset Profile of Bluetooth SIG.

Those AT command allow the exchange of messages intended to support various functions such as the hook-up, the transmission of a abridged number etc. . . .

In order to significant improve the management of the distance between the apparatus 10 and the satellite 20, it is suggested to implement one specific AT command which is used for support a new function of alarm relating to the satellite 20 (or conversely an new alarm on the mobile telephone 10).

This new command, which is defined as being a AT+BLOC, is associated with two ON and OFF parameters.

When the PROFILE layer of one of the two apparatus 10 or 20 receives the AT+BLOC associated with the parameter ON, the said apparatus generates an appropriate alarm signal, which can be displayed or auditive, so as to advise the user of the close proximity of the apparatus. And thus help the user to find the apparatus which he might have lost.

The receiving of the same command AT+BLOC, but now associated with a OFF parameter, stops the alarm signal.

It is therefore possible for a user, who might have lost its bluetooth headset, to control, via his mobile telephone, an alarm circuit located on its headset so as to help him to find it and determined its accurate physical position.

Generally speaking, the alarm circuit may be any electronic circuit, based on the generation of an alarm signal which can be displayed or auditive, vibratory etc. . . . and may take various forms and embodiments. Therefore, the practical details of such circuits shall not be further elaborated on.

The new function which is proposed, based on the use of a AT+BLOC commanded exchanged at the level of the PROFILE layer, significant improves and enhances the flexibility of the handling of the distance by means of the RSSI.

It might occur, however, that in some situations, the satellite device 20 is located out of control of the mobile telephone 10 and, in that case, there will be no possibility to trigger the alarm circuit indicating its location.

Figure 2:
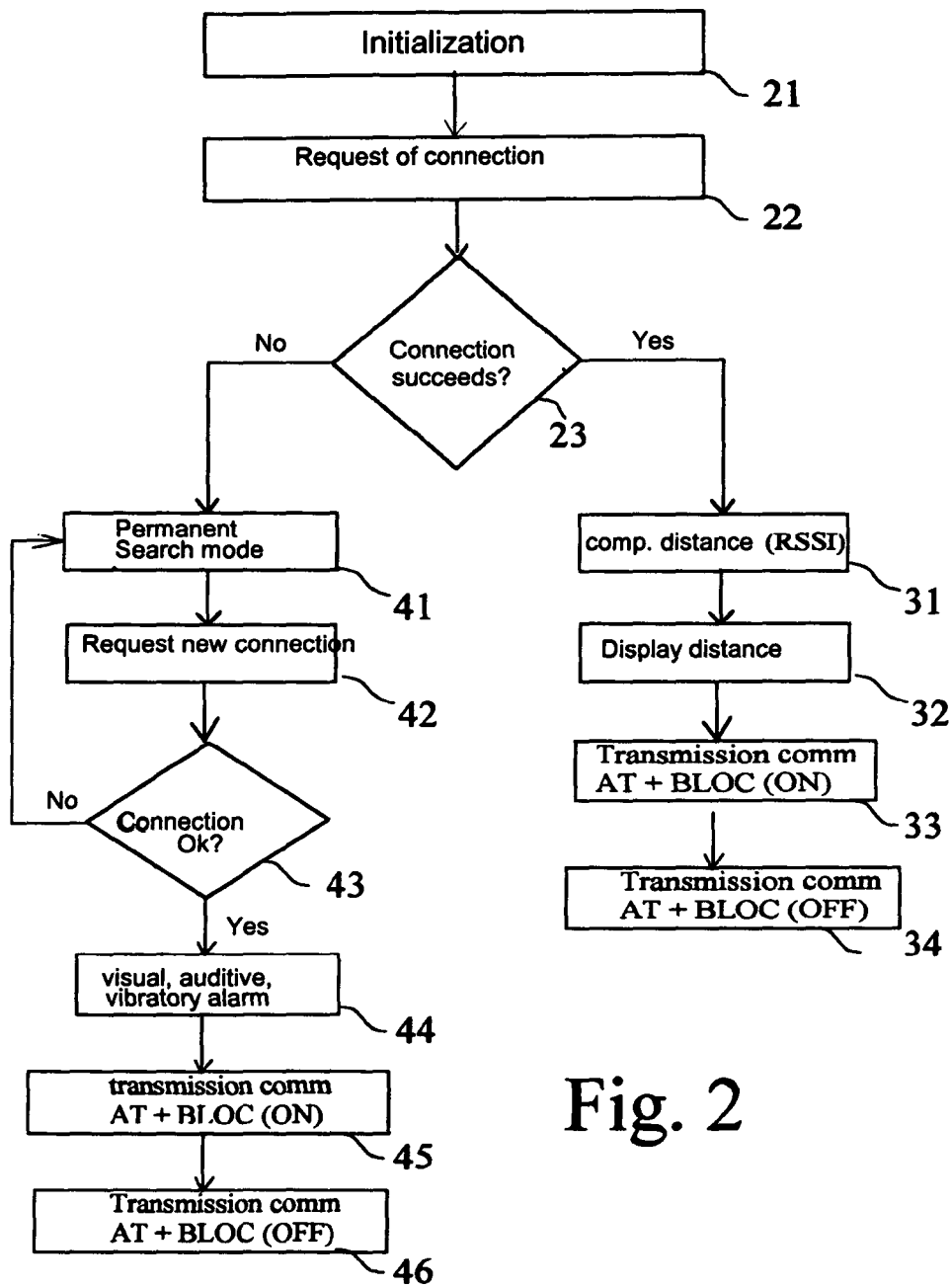
FIG. 2 illustrates a first embodiment of a process using the specific AT+BLOC command.

FIG. 2 illustrates one particular embodiment of a process, executed in one mobile telephone and based on a AT+BLOC commande, which solves such problem.

In a step 21, the process starts with an initializing phase allowing, for instance, the reset of counters and the activation of the communication means.

Then, in a step 22, le process proceeds with a request of connection which is transmitted to satellite 20, particularly by means of the generation of a HCl CONNECTION REQUEST command.

Step 23 is a test for determining whether the connection request can succeeds, in which case the process proceeds to a step 31 and, conversely, the process goes to a step 41.

In a step 31, the process performs an evaluation of the presumed distance separating the satellite 20 from the apparatus 10, particularly by means of an access to a look-up table giving a corresponding between said distance and the level of the RSSI signal, after having prealably and temporary deactivated the <<Power Control Request>> (PCR) function so as to maintain constant the power of transmission of the satellite being investigated while the user and the mobile are physically approaching it.

In one particular embodiment, the look-up table is loaded with reference values which introduced into the table during a tare operation, during which the mobile phone successively records various values of the RSSI corresponding to different predetermined distances.

In one step 32, the process proceeds with the display of the distance which was previously evaluated during step 31.

Step 33 is an optional step, which allows the user to control the activation of the alarm signal, luminous, auditive or vibratory, on the satellite device 20, by means of the generation of a AT+BLOC command, associated with parameter ON, and transmitted to the profile layer of said device.

Optionally, the process then proceeds with a step 34 wherein a new command AT+BLOC associated with the OFF parameter is generated so as to deactivate the satellite.

As mentioned previously, upon the failure of test 23, the process proceeds with a step 41 wherein the apparatus 10 enters into a <<permanent>> search mode corresponding to one mode where the satellite 20 is presumably lost.

In that so-called permanent search mode, apparatus 10 periodically attempts, as this is respectively illustrated with steps 42 and 43 to establish a new connection and check the actual establishment of such connection.

If the connection fails, what means that the lost satellite is out of range, the process loops back to step 41.

Conversely, if the connection succeeds, i.e. the user who carries his/her mobile phone enters within the receiving/transmitting range of the satellite 20, the process then proceeds with a step 44 for reporting to the user that the satellite has been actually detected. Practically, the mobile phone 10 can display a visual message on the display reporting the detection of the satellite.

Then, in a step 45, the process proceeds with the generation and the transmission of a specific AT+BLOC command associated to the parameter ON so as to control the generation of the alarm signal on the satellite.

Upon control of the user having found his/her audio headset or satellite 20, the process then proceeds to a step 46 wherein a new command AT+BLOC associated to the parameter OFF is issued so as to deactivate the alarm circuit on the satellite.

It can thus be seen that the process allows the searching and the quick finding of a lost satellite, and that as soon as the user and his/her telephone enters the range of reception of the latter.

The use of the specific AT+BLOC may serve for carrying out various different embodiments. In particular, one may arrange a test in the process illustrated in FIG. 2 so as to give the possibility to apparatus 10 to check whether the satellite actually supports the AT+BLOC command.

Figure 3:
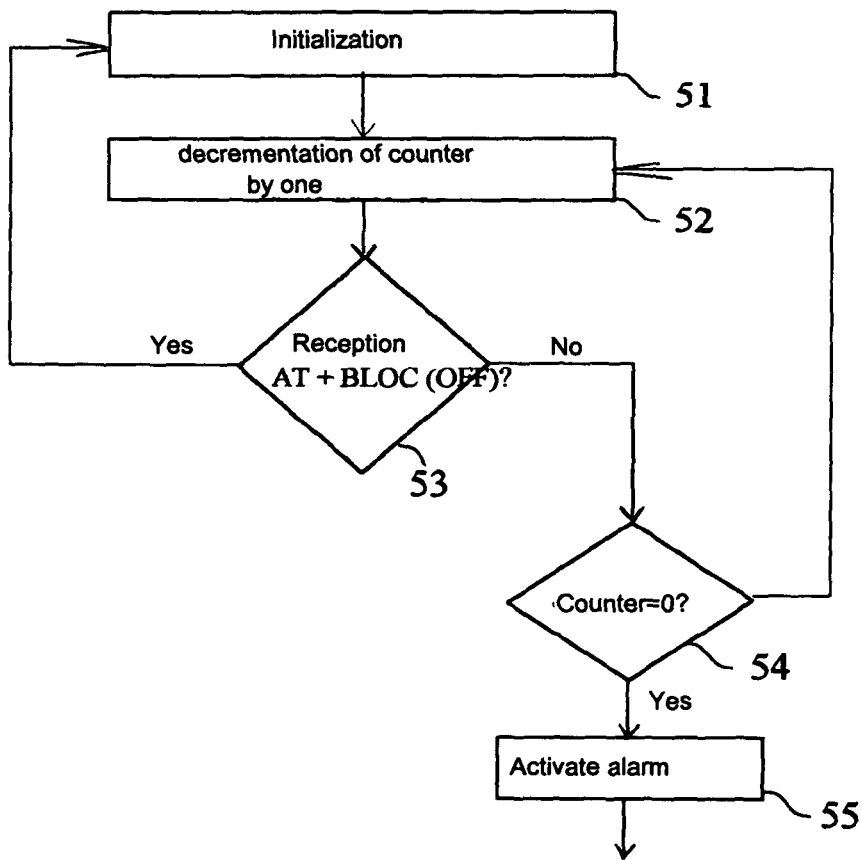
FIG. 3 illustrates a second embodiment of a process using the specific AT+BLOC command.

The process and circuit of the invention can thus be used for a wide number of applications. It can even be advantageously used for signalling the temporary moving away of the satellite with respect to the apparatus 10, as this is illustrated in a second embodiment shown in FIG. 3.

In a step 51, the process proceeds with the initialization of a counter (or decrementing circuit) within the satellite as well as the deactivation of the alarm circuit. The apparatus 10 is initialized in one state where it periodically generates the specific AT+BLOC command associated with the parameter OFF.

Then, in a step 52, the process proceeds with the decrementation of a counting unit mentioned above.

The next step 53 corresponds to a test for determining the reception of a AT+BLOC command associated with parameter OFF, which command, when received by the satellite, confirms the close proximity of the latter. In that case, the process loops back to step 51 so as to reset the counter.

When the satellite (the audio headset) is too much apart from the apparatus for allowing the establishment of a connection, the AT+BLOC (OFF) command is not received and the process executed in the satellite then proceeds with a step 54 corresponding to a test on the value reached by the counter.

If the value reached is equal to zero, then the process activates, in a step 55 the alarm circuit so as to advise the user of its moving away with respect to the location of the satellite 20, with respect to the mobile phone or apparatus 10.

If the value reached in not equal to zero, then the process loops back to steps 52-53-54 so as to performing a further subsequent test.

It can thus be seen that the counter can be used for setting a predetermined time beyond which the moving of the satellite 20 out of range with respect to the apparatus 10 will entail the generation of the alarm signal on the satellite 20, thus advising the user of the possible loss of the latter.

The invention claimed is:

1. Electronic apparatus comprising bluetooth type communication means allowing data wireless data communication, including audio communication, to a satellite, said device including a main baseband host and a bluetooth type controller; said main baseband host comprising a PROFILE layer allowing the generation of AT type command arranged for the activation of an alarm circuit on said satellite; and
    an RSSI detection means for determining the strength of the signal received from said satellite, and means for accessing a look-up table for the purpose of deriving information representative of the distance between the apparatus and said satellite;
    wherein said RSSI detection means is activated to determine the strength of the signal received from said satellite when a Power Control Request (PCR) function is deactivated.

2. Electronic apparatus according to claim 1, wherein said information representative of the distance is displayed on said apparatus.

3. Electronic apparatus according to claim 1, wherein said apparatus is a mobile phone or a mobile fitted with bluetooth capabilities.

4. Electronic apparatus according to claim 1, wherein said apparatus is a PDA type personal assistant fitted with bluetooth capabilities.

5. Detection process for a first electronic apparatus fitted with bluetooth type capabilities for detecting a second electronic apparatus also fitted with bluetooth type capabilities, said process involving the following steps:
- a first initialization phase for activating said bluetooth type communication;
- the transmission of a connection request forwarded to said second apparatus;
- a test to determine whether said connection request can succeed; and
- upon success of said test:
  - evaluation of the distance presumed between said first and second apparatus by means of a RSSI information and the reading of a look-up table giving correspondence between said RSSI information and said distance;
  - displaying said distance to the user; and
  - generation and transmission of one specific AT+BLOC command associated with a ON parameter so as to activate a presence warning circuit on said second apparatus;
- upon failure of said test,
  - setting in a permanent search mode with additional successive connection requests with said second apparatus and the subsequent test of the establishment of those additional connections and, when said subsequent test succeeds:
    - signalling to said user the successful of said connection;
    - generation and transmission of a specific AT+BLOC command associated with one ON parameter so as to activate said presence warning circuit on said second apparatus.

6. Detection process according to claim 5 wherein the user is advised by a visual message of the detection of said second apparatus.

7. Detection process according to claim 5 wherein the user is advised by an auditive/vibration message of the detection of said second apparatus.

8. Detection process according to claim 5, further involving the transmission of a AT+BLOC (OFF) message so as to deactivate said alarm circuit on said second apparatus.

9. Detection process according to claim 5 further comprising the step of, in case of success of said subsequent test, to allow the user to control the alarm signal, visual, auditive or with vibrations, on the satellite apparatus by means of the generation of a AT+BLOC command, associated with a ON parameter, transmitted to the profile layer of said apparatus.

* * * * *